United States Patent
Fane et al.

(10) Patent No.: US 8,318,017 B2
(45) Date of Patent: Nov. 27, 2012

(54) CONTAMINATED INFLOW TREATMENT WITH MEMBRANE DISTILLATION BIOREACTOR

(75) Inventors: Anthony G. Fane, Grays Point (AU); Jirachote Phattaranawik, Trondheim (NO); Fook-Sin Wong, Singapore (SG)

(73) Assignee: Nanyang Technological University, Singapore (SG)

( * ) Notice: Subject to any disclaimer, the term of this patent is extended or adjusted under 35 U.S.C. 154(b) by 638 days.

(21) Appl. No.: 11/993,665

(22) PCT Filed: Jun. 16, 2006

(86) PCT No.: PCT/SG2006/000165
§ 371 (c)(1),
(2), (4) Date: Sep. 28, 2009

(87) PCT Pub. No.: WO2006/137808
PCT Pub. Date: Dec. 28, 2006

(65) Prior Publication Data
US 2010/0072130 A1    Mar. 25, 2010

Related U.S. Application Data

(60) Provisional application No. 60/693,421, filed on Jun. 24, 2005.

(51) Int. Cl.
*C02F 3/00* (2006.01)
(52) U.S. Cl. .................... 210/631; 210/295; 210/500.23; 210/500.27
(58) Field of Classification Search .................. 210/631, 210/295, 500.23, 500.27
See application file for complete search history.

(56) References Cited

U.S. PATENT DOCUMENTS

| | | | |
|---|---|---|---|
| 4,460,473 | A | 7/1984 | Curtin |
| 4,875,980 | A | 10/1989 | Arita et al. |
| 5,558,774 | A | 9/1996 | Tonelli et al. |
| 6,616,843 | B1 | 9/2003 | Behmann et al. |
| 6,805,806 | B2 | 10/2004 | Arnaud |
| 6,982,037 | B2 | 1/2006 | Horng et al. |

(Continued)

FOREIGN PATENT DOCUMENTS

DE    41 16 426 A1    11/1992

OTHER PUBLICATIONS

Gryta, M., "The assessment of microorganism growth in the membrane distillation system", Desalination, Elsevier, Amsterdam, NL, vol. 142, No. 1, Jan. 20, 2002, pp. 79-88, XP 004351080.

(Continued)

*Primary Examiner* — Chester Barry
(74) *Attorney, Agent, or Firm* — Dinsmore & Shohl LLP

(57) ABSTRACT

A membrane distillation bioreactor (100) is provided for treating contaminated inflow such as wastewater. A contaminated inflow may be treated by biodegrading a contaminant in the inflow with a biological agent in the bioreactor to produce a lower contaminant inflow, which may be distilled, by membrane distillation, through a distillation membrane (108) in fluid communication with the bioreactor, to produce an outflow. The inflow may be wastewater. The outflow may be purified water. In one embodiment, the membrane may be located in the reaction chamber of the bioreactor vessel (102) and may be submerged in the mixed liquor. In a different embodiment suitable for wastewater treatment, the membrane may be located external to the bioreactor. The bioreactor may be aerobic or anaerobic.

45 Claims, 9 Drawing Sheets

U.S. PATENT DOCUMENTS

2004/0000521 A1* 1/2004 Vane et al. .................. 210/640
2005/0194310 A1 9/2005 Yamamoto et al.
2006/0081534 A1 4/2006 Dimitriou et al.

OTHER PUBLICATIONS

Suvilampi, J., and Rintala, J., "Thermophilic aerobic wastewater treatment, process performance, biomass characteristics, and effluent quality", Reviews in Environmental Science and Biotechnology, vol. 2, 2003, pp. 35-51, XP002531766.

European Search Report for corresponding EP Patent Application No. 06748115.0-1213/1909948, dated Jul. 6, 2009.

Chinese Patent Office, "Office Action", Jul. 1, 2010, in related Chinese Patent Application No. 200680027272.4.

Dubois, M. et al., "Colorimetric Method for Determination of Sugars and Related Substances", Analytical Chemistry, 1956, pp. 350-356, vol. 28, No. 3.

Bradford, M.M., "A Rapid and Sensitive Method for the Quantitation of Microgram Quantities of Protein Utilizing the Principle of Protein-Dye Binding", Analytical Biochemistry, 1976, pp. 248-254, vol. 72.

Rautenbach, R. and R. Mellis, "Waste Water Treatment by a Combination of Bioreactor and Nanofiltration", Desalination, 1994, pp. 171-188, vol. 95, iss. 2.

Rautenbach, R. and R. Mellis, "Hybrid Processes Involving Membranes for the Treatment of Highly Organic/Inorganic Contaminated Waste Water", Desalination, 1995, pp. 105-113, vol. 95, iss. 2.

Azeredo, J. et al., "Methods to Extract the Exopolymeric Matrix from Biofilms: A Comparative Study", Wat. Sci. Tech., 1999, pp. 243-250, vol. 39, No. 7.

Zhang, X. et al., "Comparison of Extraction Methods for Quantifying Extracellular Polymers in Biofilms", Wat. Sci. Tech., 1999, pp. 211-218, vol. 39, No. 7.

Gryta, M. et al., "Ethanol Production in Membrane Distillation Bioreactor", Catalysis Today, 2000, pp. 159-165, vol. 56.

Tomaszewska, M., "Membrane Distillation—Examples of Applications in Technology and Environmental Protection", Polish Journal of Environmental Studies, 2000, pp. 27-36, vol. 9, No. 1.

Gryta, M., "The Fermentation Process Integrated with Membrane Distillation", Separation and Purification Technology, 2001, pp. 283-296, vol. 24.

Choi, J. et al., "A Novel Application of a Submerged Nanofiltration Membrane Bioreactor (NF MBR) for Wastewater Treatment", Desalination, 2002, pp. 413-420, vol. 146, iss. 3.

Cicek, N., "A Review of Membrane Bioreactors and their Potential Application in the Treatment of Agricultural Wastewater", Canadian Biosystems Engineering, 2003, pp. 6.37-6.49, vol. 45.

Choi, J.-H. et al., "Comparison of Treatment Efficiency of Submerged Nanofiltration Membrane Bioreactors Using Cellulose Triacetate and Polyamide Membrane", Water Science and Technology, 2005, pp. 305-312, vol. 51, No. 6-7.

Curcio, E. and E. Drioli, "Membrane Distillation and Related Operations—A Review", Separation and Purification Reviews, 2005, pp. 35-86, vol. 34.

International Search Report for International Patent Application No. PCT/SG2006/000165, filed Jun. 16, 2006, (PCT/ISA/220), ISA/AU, Woden Act, Australia.

Liu et al., "Extraction of Extracellular Polymeric Substances (EPS) of Sludges", Journal of Biotechnology, 2002, pp. 249-256, vol. 95.

Chinese Patent Office, "Office Action", Oct. 10, 2011, in related Chinese Patent Application No. 200680027272.4 and an English Translation thereof.

* cited by examiner

CONTAMINATED INFLOW TREATMENT WITH MEMBRANE DISTILLATION BIOREACTOR

CROSS-REFERENCE TO RELATED APPLICATIONS

This application claims the benefit of U.S. provisional application Ser. No. 60/693,421 filed Jun. 24, 2005, the contents of which are incorporated herein by reference.

FIELD OF THE INVENTION

The present invention relates to inflow treatment, and in particular to treatment of contaminated inflow using bioreactors and distillation membranes.

BACKGROUND OF THE INVENTION

Conventional membrane bioreactors (MBR) have been used to treat inflow such as wastewater, which contains water and contaminants such as biodegradable organics and bacteria, to obtain cleaner water.

In a typical conventional wastewater treatment process using an MBR, wastewater is fed to a bioreactor. The bioreactor contains a biomass such as activated sludge, which biodegrades certain biodegradable contaminants in the wastewater. The activated sludge contains bacterial floc. The wastewater and the biomass form a mixed liquor in the bioreactor. The mixed liquor may include suspended materials such as a mixed liquid-solid suspension. A filtration membrane module is used to purify the mixed liquor, which may be submerged in the mixed liquor or placed external to the bioreactor. The membrane in the membrane module has a feed side which is in contact with the mixed liquor or the "feed", and an opposite, permeate side from which the permeate is collected. The membrane has pores allowing liquid to pass through but will block biomass material such as the bacterial floc. When a pressure difference is established between the feed side and the permeate side (such as by pressurization on the feed side or suction on the permeate side), water and other fluidic materials including residual organics dissolved in water are forced into the permeate side internal channel through the pores. However, biomass materials such as bacterial floc are blocked and stay on the feed side. The permeate is then collected for further use or discharge. The membranes used in conventional MBRs for wastewater treatment include microfiltration (MF) membranes (with pore sizes of about 0.1 to 0.2 micron) and ultrafiltration (UF) membranes (with pore sizes of about 0.01 to 0.1 micron).

However, conventional MBRs and wastewater treatment processes using MBRs have certain drawbacks. For example, while MF and UF membranes can remove bacterial floc from the permeate, these membranes only provide limited retention of residual organics, which include feed organics that have not degraded and metabolic by-products, since the residual organics are dissolved in water and can pass through the membranes. Although additional equipment may be provided to separate the non-degraded organics downstream of the bioreactor and membrane and recycle them back to the bioreactor, this results in increased cost, energy consumption and equipment volume.

Attempts to improve retention of residual organics have been made by replacing MF or UF membranes with Nanofiltration (NF) membranes, which have smaller pore sizes. However, NF also has some drawbacks. One problem is that a system with a submerged NF membrane produces low permeate flux (the rate of permeate production per unit membrane area), as compared to a system with an MF or UF membrane. While a system with an external NF membrane may produce a higher permeate flux, it requires more energy and higher cost to operate.

Further, it is desirable to be able to monitor membrane breakdown without expensive and sophisticated techniques and equipments, which are often required in conventional MBR systems for wastewater treatment.

It is also desirable to provide treatment systems with a small "footprint" (the floor space occupied by the system).

Accordingly, there is a need for improved contaminated inflow treatment systems and methods.

SUMMARY OF THE INVENTION

In accordance with an aspect of the present invention, there is provided a method of treating a contaminated inflow. The method comprises providing a bioreactor vessel defining a reaction chamber; providing a distillation membrane located within the reaction chamber and in fluid communication with an outlet conduit; placing a biological agent, such as activated sludge, and the contaminated inflow in the reaction chamber to biodegrade a contaminant in the contaminated inflow with the biological agent, thus producing a lower contaminant inflow (i.e., with lower contaminant concentration); distilling, by membrane distillation, the lower contaminant inflow through the distillation membrane to produce an outflow; and extracting the outflow out of the reaction chamber through the outlet conduit.

In accordance with another aspect of the present invention, there is provided a system for treating a contaminated inflow. The system comprises a bioreactor vessel defining a reaction chamber, for biodegrading the contaminated inflow in the reaction chamber with a biological agent to produce a lower contaminant inflow; a distillation membrane located within the reaction chamber, for distilling, by membrane distillation through the distillation membrane, the lower contaminant inflow to produce an outflow; and an outlet conduit in fluid communication with the distillation membrane for extracting the outflow out of the reaction chamber.

In accordance with another aspect of the present invention, there is provided a method of treating wastewater. The method comprises providing a bioreactor vessel defining a reaction chamber; providing a distillation membrane in fluid communication with the reaction chamber; biodegrading a contaminant in the wastewater with a biomass in the reaction chamber to produce low contaminant wastewater; and—distilling, by membrane distillation, the low contaminant wastewater through the distillation membrane to produce purified water.

In accordance with another aspect of the present invention, there is provided a system for treating wastewater, comprising a bioreactor vessel defining a reaction chamber, for biodegrading a contaminant in the wastewater with a biomass in the reaction chamber to produce low contaminant wastewater; and a distillation membrane in fluid communication with the bioreactor vessel, for distilling, by membrane distillation through the distillation membrane, the low contaminant wastewater to produce purified water.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

DETAILED DESCRIPTION

Figure 1:
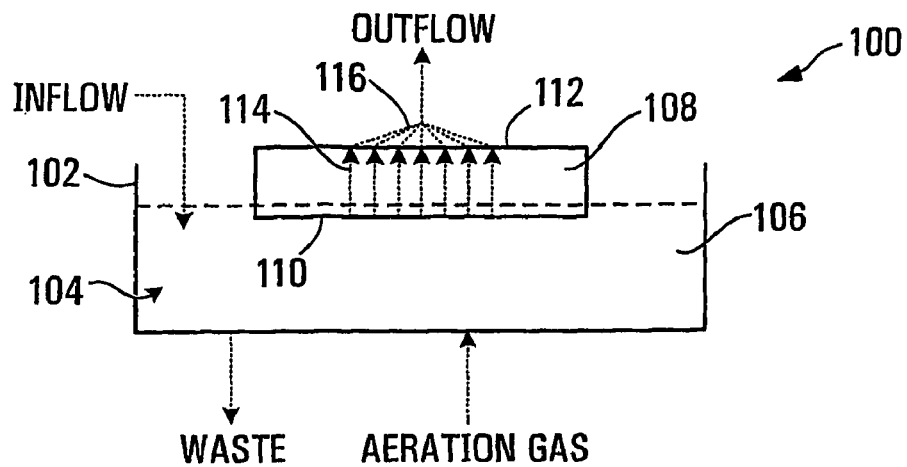
FIGS. 1 to 3 are schematic cross-sectional views of respective exemplary membrane distillation bioreactors (MDBR)

In overview, a contaminated inflow can be treated using a hybrid membrane distillation bioreactor (MDBR) system. The system includes a bioreactor for biodegrading one or more contaminants of the inflow to produce a lower contaminant inflow, and a membrane distillation (MD) unit having a distillation membrane (DM) in fluid communication with the bioreactor for distilling, by membrane distillation, the lower contaminant inflow through the distillation membrane to produce an outflow. The contaminant concentration is lower in the lower contaminant inflow than in the contaminated inflow. The inflow may contain wastewater and the outflow may contain treated water. In one embodiment, the membrane is located within the bioreactor vessel. In a different embodiment suitable for wastewater treatment, the membrane does not need to be in the bioreactor vessel and may be located outside the bioreactor vessel. In an inflow treatment process, the inflow is fed to the bioreactor, which contains a biological agent for biodegrading a contaminant in the inflow. One or more contaminants of the inflow are biodegraded in the bioreactor, producing a lower contaminant inflow. The lower contaminant inflow is then membrane distilled through the distillation membrane, producing an outflow, which may have further reduced contamination.

As can be understood, a distillation membrane has a feed side and a permeate side, and defines a permeation path between the feed side and the permeate side for allowing a desired volatile substance to permeate therethrough in a vapor phase but substantially blocks passage of any substance in a liquid or solid phase. In membrane distillation, a feed is introduced to the feed side of the membrane. The feed includes the volatile substance, which permeates through the distillation membrane in a vapor phase from the feed side to the permeate side when the vapor pressure on the feed side is higher than the vapor pressure on the permeate side. The permeate vapor is collected by condensation into a cool liquid flow or onto a cool surface. The MD process used in embodiments of the present invention may be any suitable MD technique, including a conventional MD technique such as direct contact MD, sweep gas MD, air gap MD, vacuum MD, isothermal (or osmotic) MD, and the like, or any combination thereof. These MD techniques can be readily implemented by one skilled in the art.

For instance, in direct contact MD, the permeate vapor is condensed into and collected by a cool solution in contact with the permeate side of the distillation membrane. The cool solution may be a solution of the condensed permeate and may be recycled.

In vacuum MD, a vacuum may be maintained at the permeate side, such as by a vacuum pump (not shown). The permeate vapor may be collected by the vacuum pump. The permeate vapor from the vacuum pump discharge can then be condensed in a condenser (not shown).

In air-gap MD, an air gap may be provided between the permeate side surface of the membrane and a cool collecting surface. The permeate vapor can travel through the air gap and condense on the cool collecting surface.

In sweep-gas MD, a sweep gas may flow across the permeate side of the membrane to carry the permeate vapor away from the membrane.

In isothermal (or osmotic) membrane distillation, the vapor pressure difference is achieved by using a permeate stream of high osmotic pressure which has a lowered vapor pressure. Further processing of this stream is necessary to recover water product.

As can be appreciated, in each of these MD techniques, a lower permeate vapor pressure is established on the permeate side. As can be understood, increasing the vapor pressure difference across the membrane can increase the permeate flux (the permeate flow rate per unit area of membrane). To increase the vapor pressure difference, the temperature at the feed side may be increased.

In embodiments of the present invention, the feed side of the distillation membrane may be in direct contact with the lower contaminant inflow. The membrane may be located in or outside the bioreactor, as will be described below. The distillation membrane may be a microporous hydrophobic membrane. It may be a tubular membrane, flat sheet membrane or a hollow fiber membrane. The membrane may be incorporated into a membrane module. The membrane module may include a tubular membrane or a double-faced flat-sheet membrane or a hollow fiber membrane. The membrane module may be a submerged module or a side-stream module.

The inflow to be treated may include any fluid, solution, mixed liquid-solid suspension, or any other fluidic matter. For example, the inflow may be wastewater or an effluent, either pretreated or non-pretreated.

As can be understood, an MDBR system may be advantageous in many applications. For example, when used in a wastewater reclamation system, residual organics in the mixed liquor can be effectively removed from the outflow. In fact, any solid or liquid contaminants in the mixed liquor can be effectively removed and separated from the permeate, as long as the contaminants have sufficiently low vapor pressure at the feed side temperature, as compared to the water vapor pressure. This allows sufficient time for the organic solutes in the mixed liquor to decompose in the bioreactor. Only after these solutes have been decomposed, the decomposed substance may become permeable through the distillation membrane. Thus, the residence or retention time of the biodegradable organics in the bioreactor can be very (even infinitely) long, ensuring sufficient biodegradation. Further, an MDBR system, even with a submerged membrane module, can produce permeate fluxes that are comparable to those of conventional MF or UF MBR systems, and much higher than that of a conventional NF MBR system, under similar operating conditions.

FIG. 1 illustrates an MDBR 100, exemplary of an embodiment of the present invention. MDBR 100 includes a bioreactor vessel 102, which defines a reaction chamber 104 for receiving mixed liquor 106. A distillation membrane 108, which has a feed side 110 and a permeate side 112, is positioned relative to chamber 104 so that feed side 110 is in contact with mixed liquor 106. Membrane 108 is in fluid communication with reaction chamber 104 and may be located within or outside reaction chamber 104. Membrane 108 defines a permeation path 114 from feed side 110 to permeate side 112. Membrane 108 may be porous and the average pore size of membrane 108 may be selected so that the vapor of the feed, such as water, in mixed liquor 106 is allowed to permeate through membrane 108 from feed side 110 to permeate side 112, but passage of any substance in mixed liquor 106 in liquid or solid phase from feed side 110 to permeate side 112 is substantially prevented or blocked.

Bioreactor vessel 102 may be constructed in any suitable manner with suitable materials, and may have a conventional structure, depending on the particular application. For example, the bioreactor may be selected or constructed depending on whether the biodegrading reaction to be carried out is aerobic or anaerobic. A bioreactor for biodegrading the contaminants aerobically is referred to as an aerobic bioreactor and a bioreactor for biodegrading the contaminants anaerobically is referred to as an anaerobic bioreactor. As can be understood, either aerobic or anaerobic bioreactors may be used in embodiments of the present invention, depending on the particular application. The bioreactor may be a heated suspended solid aerobic bioreactor. The bioreactor may be a bioreactor suitable for wastewater treatment or reclamation. Bioreactor vessel 102 can be any suitable tank or vessel for containing a fluid. The material of the tank or vessel may be selected based the type of inflow and biomass to be contained in the tank or vessel. When it is desirable to heat the mixed liquor in the bioreactor, bioreactor vessel 102 may be made of materials that are suitable for high temperature applications. Bioreactor vessel 102 may be a thermophilic bioreactor and the biomass may be thermophilic. For example, the biomass for the bioreactor may be cultured and acclimatized so that it is thermophilic, as can be understood by persons skilled in the art. The materials for constructing bioreactor vessel 102 and any piping (not shown) that is required for the operation of the system may need to be resistant to biological attachment, to microbial digestion, and to weak acid or base attacks, as can be understood by persons skilled in the art.

Membrane 108 may be a flat sheet membrane, as shown, or may be of another suitable type or shape, as will be further described below. Membrane 108 may be in the form of a membrane module or unit. More than two sheets or layers of membrane may be included. The membrane module may also have various structures, shapes and sizes, depending on the application. The membrane module may be of any suitable type, such as double-face flat sheet, flat sheet cassette, spiral wound, tubular, hollow fiber, or the like.

Membrane 108 may be made of any suitable material. The wall of membrane 108 may be microporous. The membrane may have hydrophobic properties. For instance, the surfaces of membrane 108, including its inner pore surfaces, may be hydrophobic. For example, the surfaces on, and the pore surfaces near, permeate side 112 may be hydrophobic, while the feed side surface may be hydrophobic or hydrophilic. When the membrane material is hydrophobic, the feed side surface may be chemically or physically modified or treated so that it is hydrophilic, as can be understood by one skilled in the art. The membrane may be made of a polymer material. Suitable materials for forming a distillation membrane includes microporous, hydrophobic, and polymeric materials such as polypropylene (PP), polyvinylidene fluoride (PVDF), polytetrafluoroethylene (PTFE), and the like.

The material and pore structure of the membrane are selected so that gases such as water vapor or vapors of other volatile components can permeate through the membrane wall, but liquid and solid matters are prevented from passing through the pores. It may be advantageous if the internal surfaces of the pores are hydrophobic so that the pore surfaces will stay dry during operation. As can be understood, complete blockage of liquid and solid matter into the pores may not be possible or necessary. Some wetting of the pores or passage of liquid or solid material may be tolerable, but it may be advantageous to minimize or reduce such wetting and passage. For example, in some embodiments, the average pore size may be in the range of 0.050 to 5 micron and the wall thickness may be in the range of 0.05 mm to 1.5 mm. The membrane may have porosity in the range of 50 to 90%.

The membrane material may have other optional or necessary characteristics or properties, depending on the application and as can be understood by persons skilled in the art. For example, it may be advantageous if the material resists chemical or biological attacks from components of the inflow.

MDBR 100 may also include other components required for its proper operation, which are not shown for simplicity and clarity reasons. Those skilled in the art can readily understand and provide those necessary or optional components. Some of these components are described below in the context of other exemplary embodiments.

In operation, one or more biodegrading agents are disposed in chamber 104. For example, the biodegrading agents may include a biomass such as an activated sludge or an anaerobic biomass.

An inflow such as wastewater is introduced into chamber 104. For example, the inflow may include organic wastewater, such as dye wastewater, residential wastewater, agricultural wastewater, or the like. The inflow contains one or more contaminants, such as organic contaminants, bacteria or the like, that can be biodegraded by the biodegrading agent(s). The inflow also contains a volatile feed, such as water. The inflow may contain certain solid or fluid components that are to be removed and separated from the water. For example, wastewater may include one or more contaminants including solid contaminants, which need to be removed so that the treated water can be re-used. The inflow may contain suspended solid particulates or colloidal dispersions.

The biodegrading agent may include biomass and may be capable of biodegrading the contaminant aerobically or anaerobically, depending on the application.

The inflow and the biodegrading agents are mixed in chamber 104 to form mixed liquor 106. Mixed liquor 106 may contain a mixed liquid-solid suspension. Mixed liquor 106 may contain a solvent such as water and may contain various solutes, suspended particulates, colloidal dispersion, or the like. Mixed liquor 106 may also contain other treatment materials such as powdered activated carbon (PAC), resin powder, or the like, or a combination thereof. As can be understood, micro- or nano-sized adsorbing powder materials such as PAC and resin powder can adsorb organic substances and can provide sites for bacteria attachment. Typically, the treatment materials are suspended in the mixed liquor, although some suspended materials in chamber 104 may settle during treatment or operation. Other materials that may be placed in chamber 104 include porous materials such as ceramic, polymer (including polyethylene), and the like. A buffering additive for adjusting the pH value of the mixed liquor may be added into chamber 104. Materials that can be added to chamber 104 may also include any suitable material that is used in conventional MBR applications.

The feed to the distillation membrane contains a volatile component to be collected, such as water. The feed may include any fluid of interest that is suitable for producing the desired permeate by membrane distillation. The feed may also include more than one volatile component.

For ease of description and illustration purposes, it is assumed below that the inflow is wastewater, and the volatile component of interest is water. However, it should be understood that other types of volatile components may also be collected, as can be understood by persons skilled in the art. It is also assumed that mixed liquor 106 contains activated sludge.

An activated sludge may, for instance, include micro-organisms for digesting contaminants in the wastewater. The sludge may include biologically activated microbial solid and may contain a mixture of flocs of microorganisms of bacteria and fungi. The sludge may be obtained in any suitable manner. For instance, it may be obtained by high temperature acclimatization of activated sludge taken from a room temperature wastewater treatment process. Alternatively, the sludge may be obtained by culturing pure thermophilic bacteria. A further alternative is to culture and acclimatize a mixture of pure thermophilic bacteria and activated sludge from a room temperature wastewater treatment process.

The inflow may be continuously fed into bioreactor vessel 102.

With time, some contaminants in the inflow are biodegraded by the biomass in bioreactor vessel 102, thus producing a low contaminant inflow in bioreactor vessel 102. A contaminant may be biodegraded in any suitable biological reactions, such as those involving metabolism, biological oxidation and reduction, metabolism-chemotrophs, chemoorganotrophs, chemolithotrophs, electron and energy transfer and investment, or the like. These reactions may occur at temperatures from 10 to 90° C. The temperature of the mixed liquor may also be maintained in the range from 40 to 90° C. As can be appreciated, a higher temperature at the feed side of the distillation membrane can produce a higher permeate flux, and may thus be advantageous in some applications.

In the meantime, a sufficient vapor pressure difference is established across distillation membrane 108 so that water vapor permeates through membrane 108. However, transport of any substance in a liquid or solid phase through membrane 108 is substantially inhibited. Even water in the liquid phase is substantially blocked by membrane 108. Therefore, the permeate 116 permeated through membrane 108 has reduced contamination.

Permeate 116 is condensed and collected as an outflow, in a manner dependent on the MD technique used in any particular embodiment. The outflow may then be directed to a desired designation. For example, a carrying fluid or cool distillate (not shown) may be caused to flow by permeate side 112 to carry permeate 116 away from membrane 108.

To increase the permeate flux, the temperature difference between feed side 110 and permeate side 112 may be increased. For example, for treating wastewater the temperature difference may be in the range of 5 to 70° C. Mixed liquor 106 may be heated. The permeate side 112 of membrane 108 may be cooled. A cool collecting surface (not shown) may be provided on permeate side 112 for condensing and collecting the permeate. The collecting surface may be provided by the surface of a collecting plate (not shown) or a carrying fluid (not shown). The temperature difference should be sufficiently large for proper operation of the membrane distillation process and to obtain the desired permeate flux, but may vary depending on the application and the types of inflow/outflow. The mixed liquor 106 at feed side 110 may have a temperature in the range of 10 to 90° C., or in the range of 30 to 80° C. The temperature on permeate side 112 may be in the range of 5 to 30° C. An automatic temperature control system or mechanism (not shown) may be provided to control the temperatures in different regions of the bioreactor and the membrane.

A heated anaerobic bioreactor may be advantageously used in certain applications. For example, in an anaerobic bioreactor methane may be produced as a result of the biodegradation process, which may then be combusted to generate heat to conveniently heat the bioreactor, thus controlling the temperature in the mixed liquor 106.

Waste such as waste sludge may be periodically or continuously removed from chamber 104. Mixed liquor 106 in chamber 104 may be aerated with a gas such as air. Air or another gas may be supplied to mixed liquor 106, such as by a gas injector or another aeration device (not shown) placed at the bottom of chamber 104. Aeration may serve one or more purposes such as providing oxygen to the micro-organism, fouling control, or other purposes.

Figure 2:
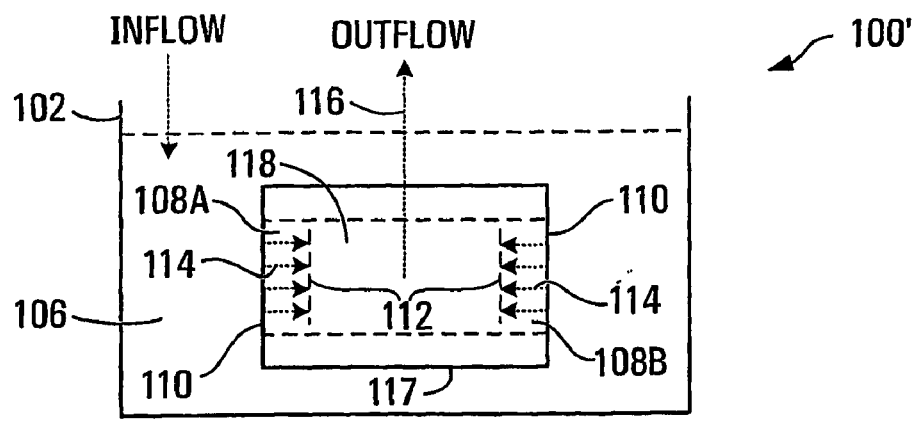

FIG. 2 shows another exemplary MDBR 100', a variation of MDBR 100. Instead of a simple flat sheet membrane, a double-faced flat sheet membrane module 117 is used. The membrane module defines an internal channel 118. Membrane module 117 has two flat sheet membranes 108A and 108B in parallel arrangement. The feed side 110 of each membrane faces outward and the permeate side 112 faces internal channel 118. Membrane module 117 is submerged in mixed liquor 106 of bioreactor vessel 102.

MDBR 100' may be similarly operated as MDBR 100. However, a larger membrane surface may be exposed to mixed liquor 106 in MDBR 100' than in MDBR 100, so that a larger permeate flow may be obtained. The permeate 116 is collected from channel 118. The collection of the permeate will be further described below. Channel 118 may form a part of a closed fluid circuit, as will be further described below, to conveniently collect permeate 116.

Figure 3:
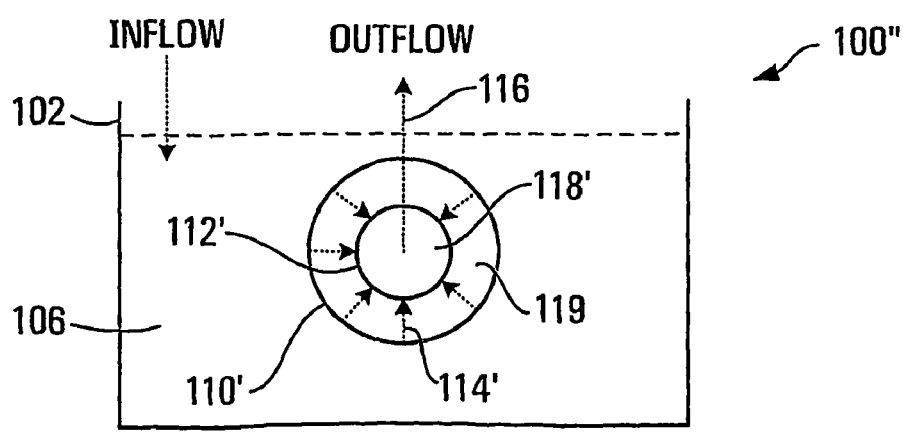

FIG. 3 illustrates a possible variation of MDBR 100'. The MDBR 100" has a tubular membrane module 119 in place of membrane module 117. Tubular membrane module 119 defines an internal channel 118' and has a tubular membrane with a feed side 110' in contact with mixed liquor 106 and a permeate side 112' from which permeate 116 can be collected through internal channel 118'. The membrane in membrane module 119 only allows volatile substances to permeate from feed side 110' to feed side 112' through the permeation path 114'.

Figure 4:
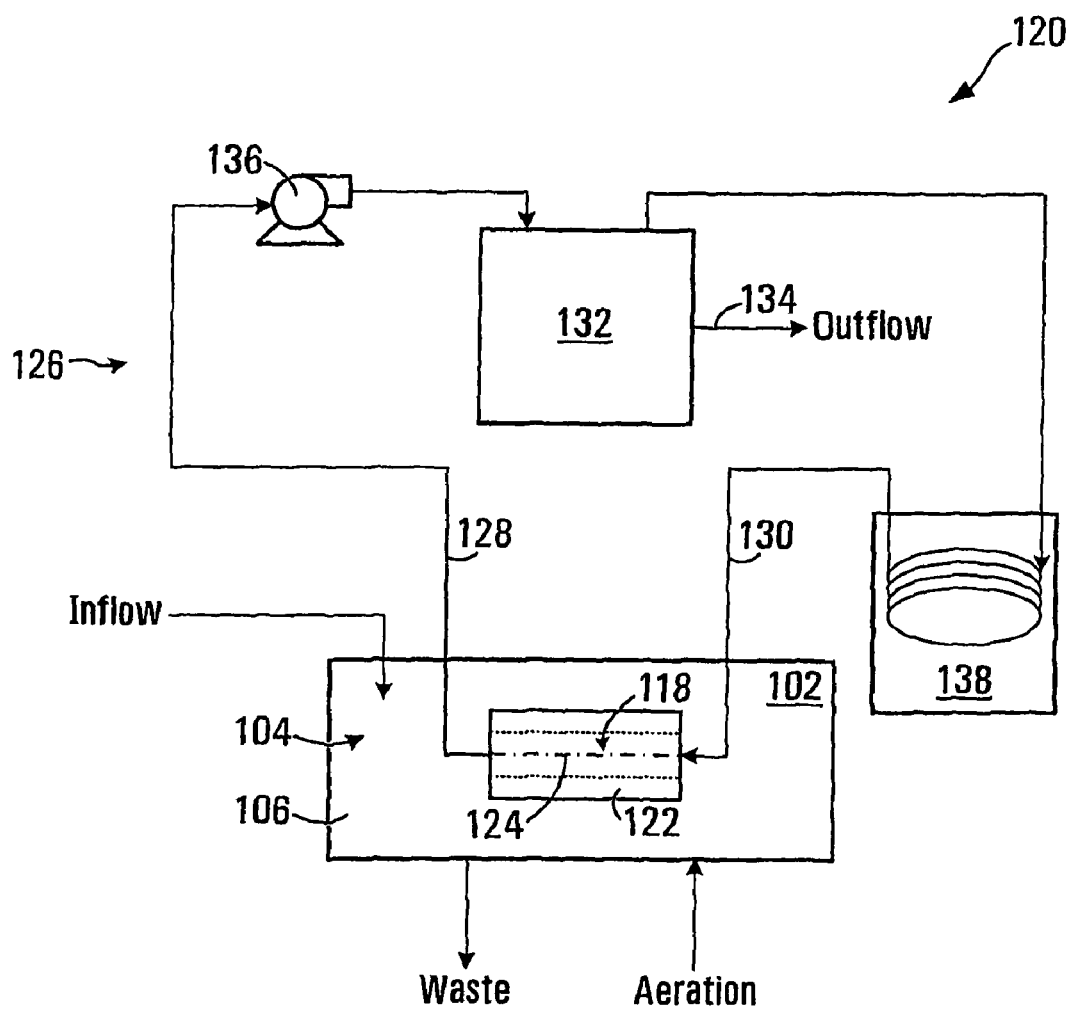
FIGS. 4 to 6 are schematic diagrams of respective exemplary MDBR systems.

FIG. 4 is a schematic view of an exemplary MDBR system 120. MDBR system 120 includes a bioreactor vessel 102 containing mixed liquor 106 in chamber 104. A membrane module 122 is submerged in mixed liquor 106.

Membrane module 122 is similar to module 117. The internal channel 118 is elongate and extends along a central, longitudinal axis 124, which is horizontally oriented. The membrane is thus horizontally oriented.

A fluid circuit 126 is provided for condensing and collecting the permeate from internal channel 118 of membrane module 122. Fluid circuit 126 includes fluid pipes 128 and 130, which are connected to respective ends of internal channel 118 to provide a fluid flow path therethrough, and a fluid reservoir 132. Pipe 128 defines an outlet conduit for extracting the distillate outflow out of chamber 104 therethrough and guiding fluid flow from channel 118 to fluid reservoir 132. Pipe 130 guides fluid flow from reservoir 132 back to channel 118. A fluid pipe 134 connected to reservoir 132 guides the outflow from reservoir 132 to a desired destination (not shown). A fluid pump 136 may be provided to drive the fluid flow in fluid circuit 126. A cooling unit 138 may be provided to cool the fluid flowing in fluid circuit 126. For example, the cooling unit may be coupled to pipe 130 for cooling the fluid flowing therethrough.

The various pipes and other components may be constructed using any suitable material in any suitable manner. The materials for the pipes and other components may be selected depending on the application, as discussed above.

As can be understood, one or more fluid control components may be provided for controlling fluid flow in an MDBR system. For example, flow rate meters or gauges and control valves may be provided for controlling the operation of the system.

In operation, a contaminated inflow such as wastewater is introduced into chamber 104. The inflow may be initially treated in chamber 104, as described above.

A carrying fluid such as water is initially provided in reservoir 132 and pumped through pipes 128 and 130 to maintain a fluid flow in channel 118. The fluid flow may be driven by pump 136 so that the fluid is withdrawn from reservoir 132, flown through pipe 130, channel 118, pipe 128, and then returned to reservoir 132. The fluid path thus forms a loop. The reservoir 132 may initially contain clean water or treated water. The carrying fluid in fluid circuit 126 is cooled by cooling unit 138.

Mixed liquor 106 may be heated, as discussed above. Thus, there is a temperature difference between mixed liquor 106 and the carrying fluid in internal channel 118. The temperature difference may be as discussed above with reference to the operation of MDBR 100. As a result, the permeate is condensed in internal channel 118, as discussed above with reference to the operation of MDBR 100', forming distilled, and purified, water.

Distilled water in channel 118 is carried away from membrane module 122 by the carrying fluid, through pipe 128 into reservoir 132.

The purified water in reservoir 132 may be extracted as outflow through pipe 134 and transported to a desired designation, such as for further treatment or re-use.

The outflow may be extracted from reservoir 132 continuously or at intervals such as at regular intervals. Optionally, outflow may be extracted depending on the amount of fluid accumulated in reservoir 132. In one embodiment, extraction of outflow may begin when the fluid in reservoir 132 reaches a maximum level and stops when the fluid is at or below a minimum level.

The temperatures in chamber 104 and channel 118 may be varied to control the distillation process and the permeate flux. For instance, the temperature difference may be reduced at intervals to allow a certain treatment process to last longer in bioreactor vessel 102 before water is collected through membrane module 122.

To increase the permeate flux, one or more of the following steps may be taken. The temperature in mixed liquor 106 may be increased. Mixed liquor 106 may be stirred, such as with a stirrer, to promote turbulent flow and eddy current therein. Air or gas bubbles, or air sparging, may be used to induce shear stress at the membrane surface, or to promote turbulence in mixed liquor 106. The viscosity of mixed liquor 106 may be reduced by promoting attachment of micro-organisms to a bio-media support. Vibration of the membrane surface and molecules in mixed liquor 106 may be induced with ultrasonic sound waves, to prevent fouling of the membrane surfaces and to promote evaporation of water on the membrane surfaces. Other suitable steps may also be taken.

Figure 5:
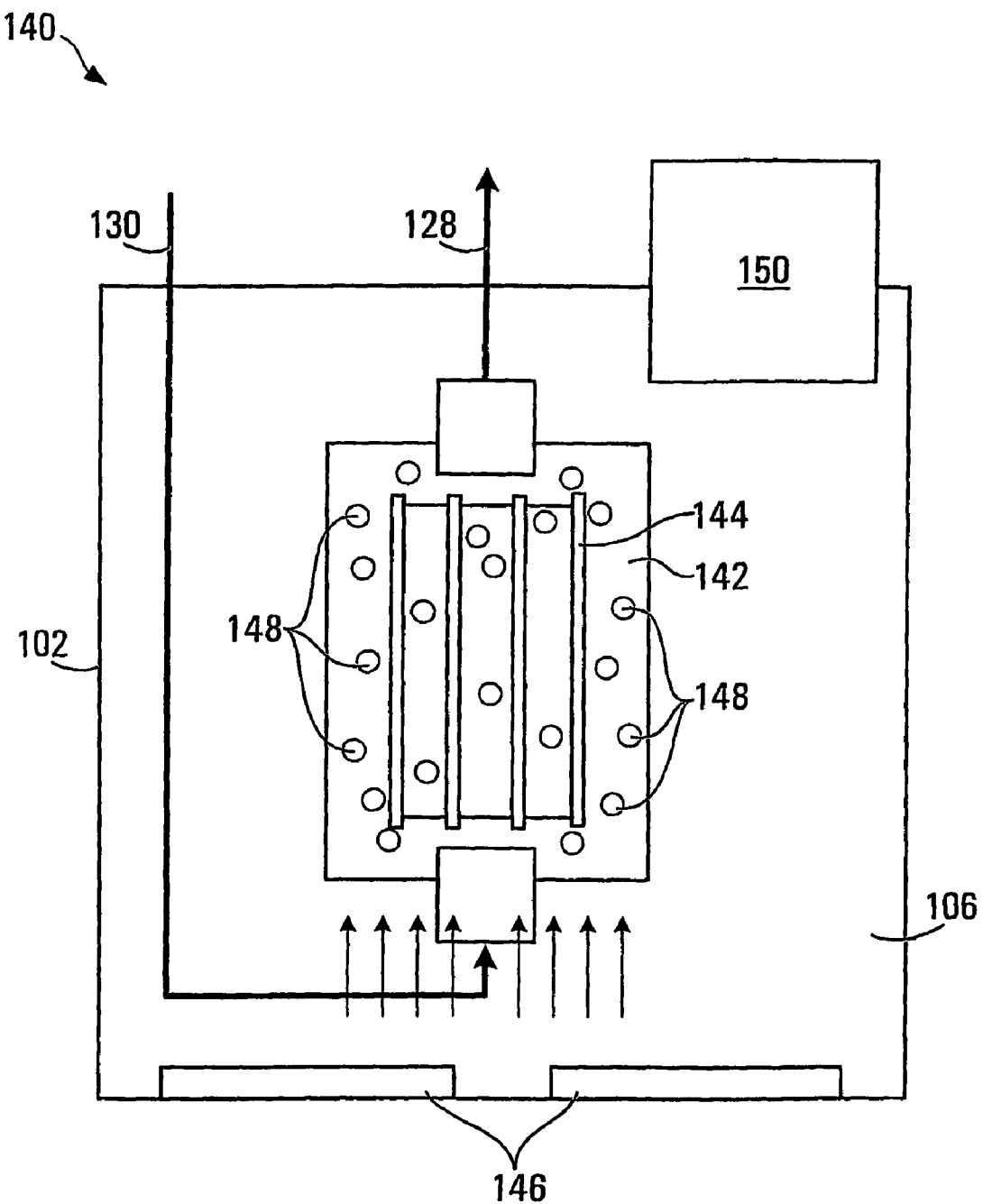

Various variations or modifications to MDBR system 120 are possible. For example, FIG. 5 schematically illustrates a variation of MDBR system 120. The MDBR system 140, which is only partially shown, has similar components as in MDBR system 120, including bioreactor vessel 102 that holds mixed liquor 106 and the fluid circuit (not entirely shown) for circulating the carrying fluid through the internal channel(s) in membrane module 142. Membrane module 142 is a double-faced flat sheet membrane module, similar to membrane module 117. However, membrane module 142 is oriented vertically instead of horizontally, i.e., the longitudinal axis of the internal channel of the membrane is oriented vertically. Further, a baffle 144 is provided, which can support the flat sheet membranes in module 142 and can facilitate bubble flow, thus resulting in improved hydrodynamic characteristics adjacent to the membrane surface. Gas injectors such as air diffusers 146 are positioned at the bottom of bioreactor chamber 102 for producing air bubbles 148 in mixed liquor 106. The short arrows indicate the flow direction of the bubbles during operation. An immersion heater 150 is provided to heat mixed liquor 106.

As can be appreciated, strict alignment of the longitudinal axis with the vertical or horizontal direction may not be necessary. Thus, it should be understood that the phrase "oriented vertically" or "oriented horizontally" is used herein to mean oriented generally in the vertical or horizontal direction.

Figure 6:
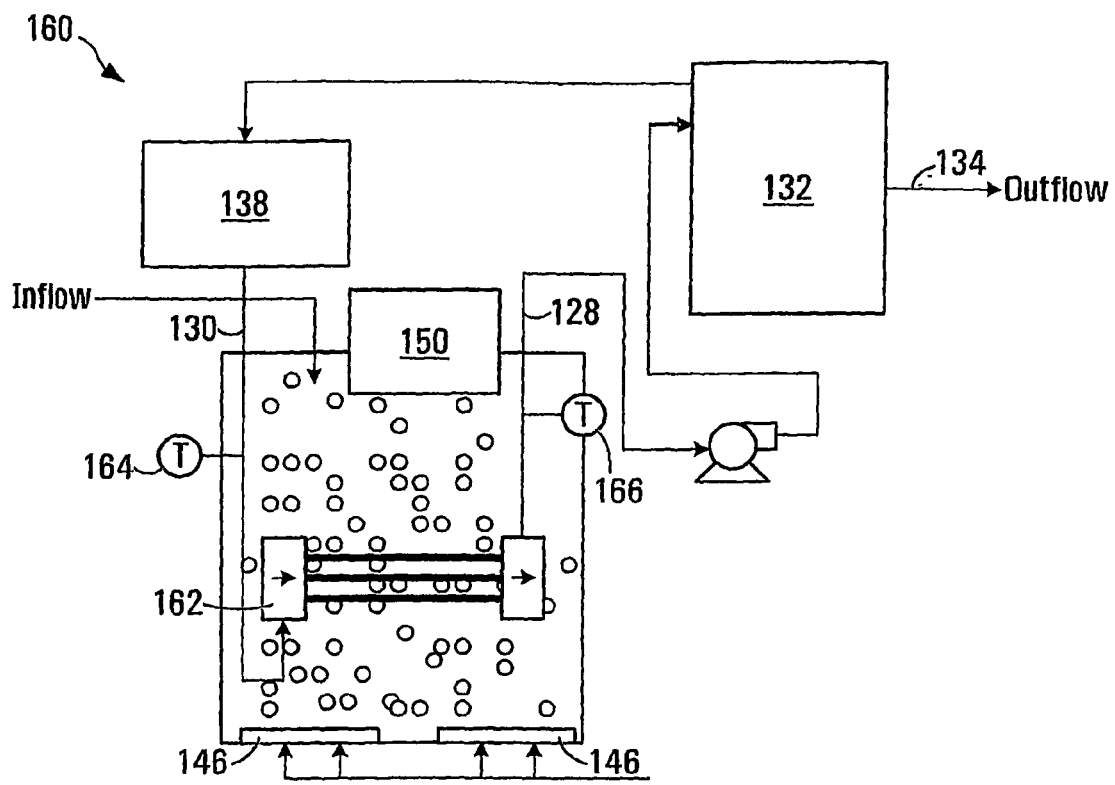

FIG. 6 schematically illustrates another variation, the MDBR system 160, which has a tubular (or hollow fiber) membrane module 162 submerged in mixed liquor 106 in bioreactor vessel 102 and oriented horizontally. Sensors 164 and 166 are provided to monitor the temperatures at different points in the circulating fluid path. Each sensor may be a thermometer.

Figure 7:
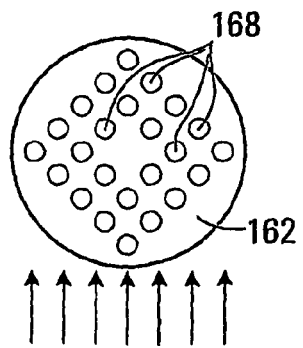
FIGS. 7 and 8 are respectively schematic cross-sectional views of two possible channel arrangements for the membrane module in FIG. 6.
Figure 8:
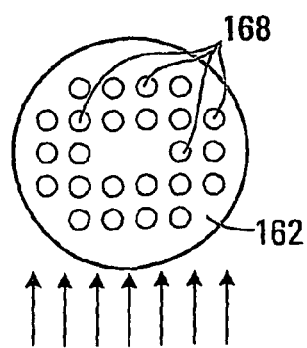

Membrane module 162 may include membrane tubes (or hollow fibers) arranged in parallel. The cross-sectional arrangement of the internal channels may be in any suitable pattern. For example, as shown in FIGS. 7 and 8, the channels 168 may be arranged in a diamond-square pattern (FIG. 7) or an octagonal pattern (FIG. 8), where the arrows indicate the air bubble flow direction.

An octagonal layout with more space at the center for tubular membrane distribution may be advantageous. For example, the octagonal layout may be more compatible with the overall internal fluid circulation in the mixed liquor, may produce more turbulence generated by bubbling flows from the air diffusers, may be more suitable for additional air sparging, and may be convenient for pumping fluid flow. Direct air sparging may be performed inside a membrane module 162 with an octagonal pattern, as indicated by the arrows in FIG. 9, where a front view of the module is shown at the top and a side cross-sectional view of the module is shown at the bottom.

When a heater such as a heating coil is immersed in the mixed liquor, fouling may occur on the outer surface of the heating coil because microbial flocs can accumulate on the heating coil and get "cooked". To reduce or prevent fouling, the coil may be cleaned from time to time, such as within short time intervals. Further, to prevent floc accumulation, air bubbles may be directed to the immersed coil surface and the liquid near the coil surface may also be stirred.

Figure 10:
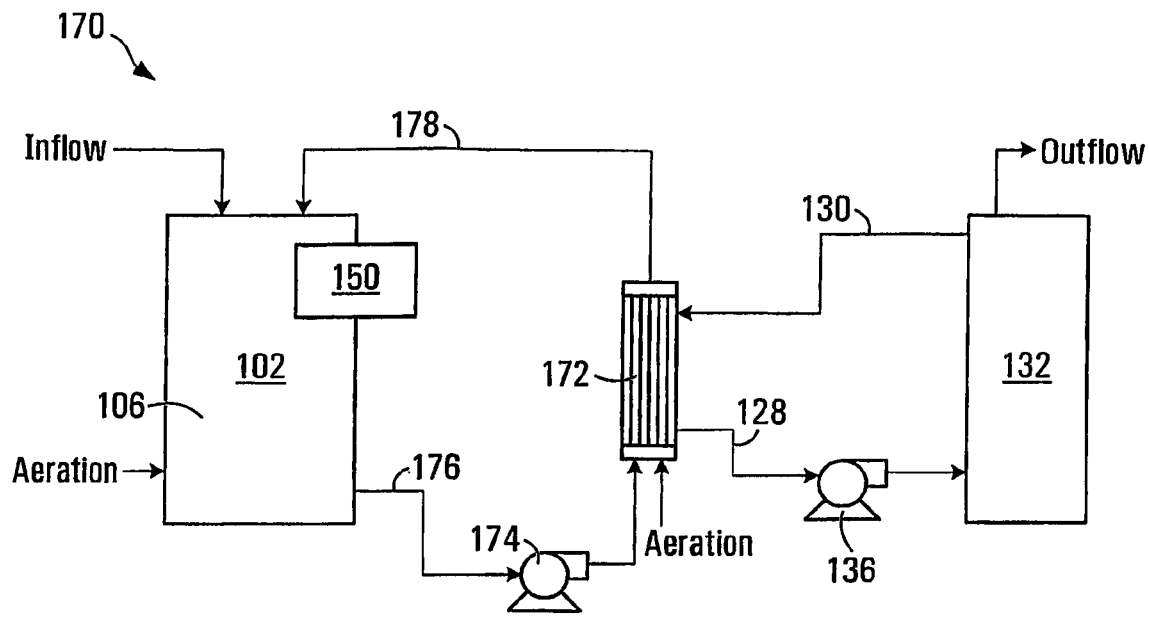
FIG. 10 is a schematic diagram of an exemplary MDBR system with an external membrane module.
Figure 11:
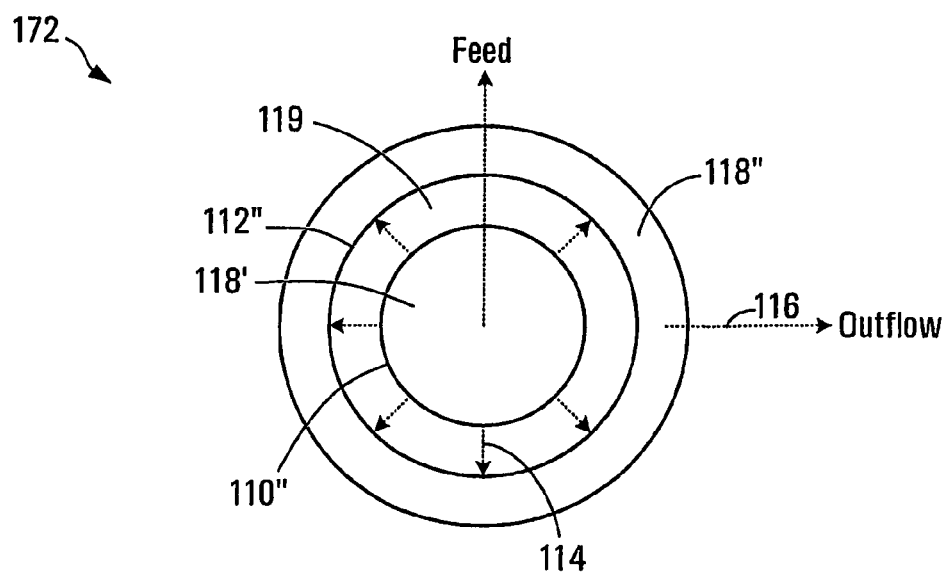
FIG. 11 is a schematic cross-sectional view of the membrane module of FIG. 10.

As discussed above, the membrane module in an MDBR system may also be located external to the bioreactor. An example is illustrated in FIGS. 10 and 11. The MDBR system 170 includes a bioreactor vessel 102 with a heater 150 and an external distillation membrane module 172 in fluid communication with bioreactor vessel 102.

Membrane module 172 is a side-stream module. Membrane module 172 may have a cross-section as illustrated in FIG. 11. As shown, membrane module 172 has a tubular membrane 119 similar to that shown in FIG. 3. However, in the embodiment as shown, the permeation direction along the permeation path 114 is reversed—the feed side 110" faces inward and the permeate side 112" faces outward. The feed, instead of the condensed permeate, is flown through the central, internal channel 118'. The permeate 116 is collected in the outer collection channel 118". In a different embodiment, the permeation direction along path 114 may be as shown in FIG. 3, in which case the feed is fed to the outer channel and the permeate is collected from the central channel.

A fluid circuit for circulating mixed liquor from bioreactor vessel 102 to and through membrane module 172 and back to bioreactor vessel 102 is provided, which includes a fluid pump 174 for driving the fluid flow, outgoing pipe 176, and return pipe 178. As in other systems described above, a fluid circuit for collecting condensed permeate is also provided, which includes pipes 128 and 130, storage tank 132, and fluid pump 136.

In operation, mixed liquor 106 is heated and biodegraded in bioreactor vessel 102. Bioreactor vessel 102 may be aerated. A feed produced in the bioreactor is then pumped from bioreactor vessel 102 to membrane module 172 via pipe 176, and through central channel 118' of membrane module 172. A permeate vapor pressure difference is established across the membrane so that water vapor permeates through path 114 from central channel 118' to outer channel 118". The permeate is condensed and collected by a cool permeate solution, in a manner similar to the processes discussed above. The feed passed through membrane module 172 is recycled back to bioreactor vessel 102 via return pipe 178.

As can be appreciated, the feed may contain biomass material that can be reused in bioreactor vessel 102, as is typically done in conventional MBR processes. Thus, at least a portion of the biomass is circulated from bioreactor vessel 102 to and through membrane module 172 and back to bioreactor vessel 102. Recycle of the biomass can be advantageous, as can be understood by persons skilled in the art.

Figure 12:
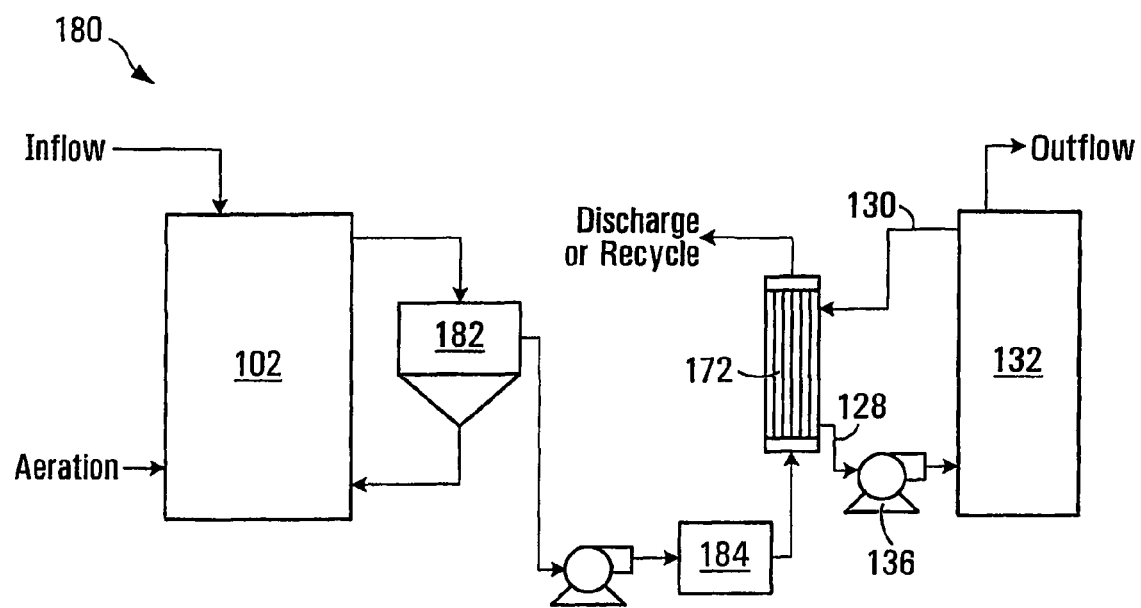
FIG. 12 is a schematic diagram of another MDBR system with an external membrane module.

A variation of system 170 is shown in FIG. 12. The MDBR system 180 is similar to system 170 except that a sedimentation tank 182 is disposed between the bioreactor vessel 102 and the membrane module 172, and that heater 150 is removed but a heater 184 is disposed just upstream of membrane module 172 to heat the feed stream going into membrane module 172. The construction and function of sedimentation tank 182 are similar to those used in conventional wastewater treatment plants. Specifically, mixed liquor extracted from bioreactor vessel 102 may contain a lot of suspended solid. After the mixed suspension is stored in sedimentation tank 182 for a period of time, certain suspended materials such as sludge floc may settle to the bottom of the tank, which can then be recycled back to bioreactor vessel 102. The feed extracted from sedimentation tank 182 and pumped through membrane module 172 contains reduced suspended material and may be either discharged or recycled back to sedimentation tank 182.

As can be understood, system 170 may be advantageous as compared to system 180, because less equipment and less physical space are required. Further, system 170 may require less energy consumption. In this regard, it may be appreciated that an MDBR system with a submerged membrane module can be even more compact and may require even less energy to operate. In addition, such a system may have lower equipment and maintenance costs.

Further, as can be appreciated, in an MDBR process with a submerged DM, high quality permeates may be produced in a single processing step. An MDBR process may be performed without using sophisticated, complex techniques and expensive instruments. For example, it is not necessary to use sophisticated and expensive instruments and techniques to monitor the membrane integrity such as fiber breakdown. As the liquid pressure in the permeate collection channel can be higher than the liquid pressure on the feed side, when the membrane or its fibers are broken, liquid water would flow from the permeate side back to the feed side. The back flow would result in an immediate, sharp drop in permeate flux, which could be easily detected. Alternatively, if the feed, and permeate pressures are similar under normal operating conditions, a damaged or wetted membrane can be detected by measuring conductivity. As can be understood, conductivity may be monitored continuously.

As can be appreciated, if the permeate pressure exceeds the feed pressure under normal operating conditions, even when the membrane is broken, the back flow would prevent contamination of the permeate received in the permeate storage such as reservoir 132.

Further, as a large portion of the dissolved residual organics in the feed is blocked by the distillation membrane, the resulting permeate or outflow can have less organic contaminants. In comparison, in a conventional MF/UF-MBR process, the permeate can contain substantial fluid contaminants such as residual organics, particularly when the membrane breaks down.

With an MDBR system, all or almost all of salt, non-volatile organic compounds and micro-organisms may be separated from the permeate. The purity and quality of the permeate in an MDBR process can be higher than that obtained in a conventional MBR process. The permeate quality in the MDBR systems is substantially independent of the biological activities in the mixed liquor in the bioreactor. The total organic carbon content (TOC) in the permeate can also be lower, such as less than 0.8 ppm, as compared to 3 to 10 ppm in a conventional MBR process. The permeate quality can be as good as obtained from a conventional MBR process combined with reverse osmosis (RO).

An MDBR process can produce less contaminated outflow, at a flux comparable to the permeate flux obtained in conventional MF or UF MBR processes.

An MDBR system can also have a fast start-up time.

In an MDBR system, the organic retention time (ORT) is independent of the hydraulic retention time (HRT), and can be very long, as it is only dependent on the reactions involving the organics. In comparison, in a conventional MBR, organics can be lost with the permeate fluid and the ORT is the same as the HRT.

Further, an MDBR system, particularly one with a submerged membrane module, may have a smaller "footprint", and thus require less land or physical space, as compared to conventional MBR systems combined with RO.

As the pipes and tanks used in an MDBR systems may be operated at low pressures, such as around one atmosphere, they may be made at a lower cost than those required for conventional MBR systems combined with RO.

Various energy sources may be used for operating an MDBR system, which may include waste heat, solar energy, geothermal energy, and the like. The MDBR process does not require a lot of electrical energy, as it is a thermal process and can operate using low grade heat for latent heat.

An MDBR system may be maintained at a lower cost, as compared to some of the conventional wastewater treatment systems.

An MDBR process may be used for wastewater treatment, such as near a power station or incinerator, or in any industry where wastewater and waste heat is produced. MDBR may also have application in wastewater treatment for oil rigs, large ships, space stations, where waste heat is abundant and space is limited.

As can be understood, it may be advantageous to operate the bioreactor at high temperatures not only to increase permeate flux but also to speed up acclimatization of thermophilic bacteria, which can be time consuming if the bioreactor is operated initially at room temperature.

In some applications, the mixed liquor may contain volatile by-products produced by the biodegradation process in the bioreactor. The by-products may include ammonia, acetic acid, formic acid, methanol, ethanol, and small volatile organics of ester or ether. In such a case, the permeate may be further treated to remove such volatile by-products. For example, a bubble column unit may be provided to remove some or all of the undesired volatile components from the outflow.

When the inflow contains inorganic salts, salt accumulation at the feed side of the membrane may occur. In such a case, a limited amount of sludge waste may be removed from the bioreactor to reduce salt accumulation, as well as for other purposes including those accomplished by sludge waste removal in conventional MBR systems.

To further illustrate, some specific examples and test results are described below.

Example I

The first example MDBR system was a system for wastewater treatment, with a layout similar to system 120 illustrated in FIG. 4. In this example system, the membrane module used was a double-faced flat sheet module, wherein the membrane was made of PVDF. The average pore size of the membrane is about 0.22 micron. The membrane was submerged in the mixed liquor contained in the bioreactor, and was oriented such that the internal channel between the membrane sheets extended horizontally. The mixed liquor in the bioreactor was heated to a temperature of about 35° C. during testing. The permeate side of the membrane had a temperature of about 26° C.

The concentration of the biological mixed liquor suspended solid (MLSS) in the mixed liquor was 3 g/l. The chemical oxygen demand (COD) was 81 ppm. The system was operated similarly as described above. The COD of the permeate was lower than 3 ppm.

The permeate flux was monitored for 11 days. During the first 6 days, air bubbles produced by aeration did not scour the membrane surface. After 6 days, the mixed liquor had been aerated from the bottom to scour the membrane surface.

Figure 13:
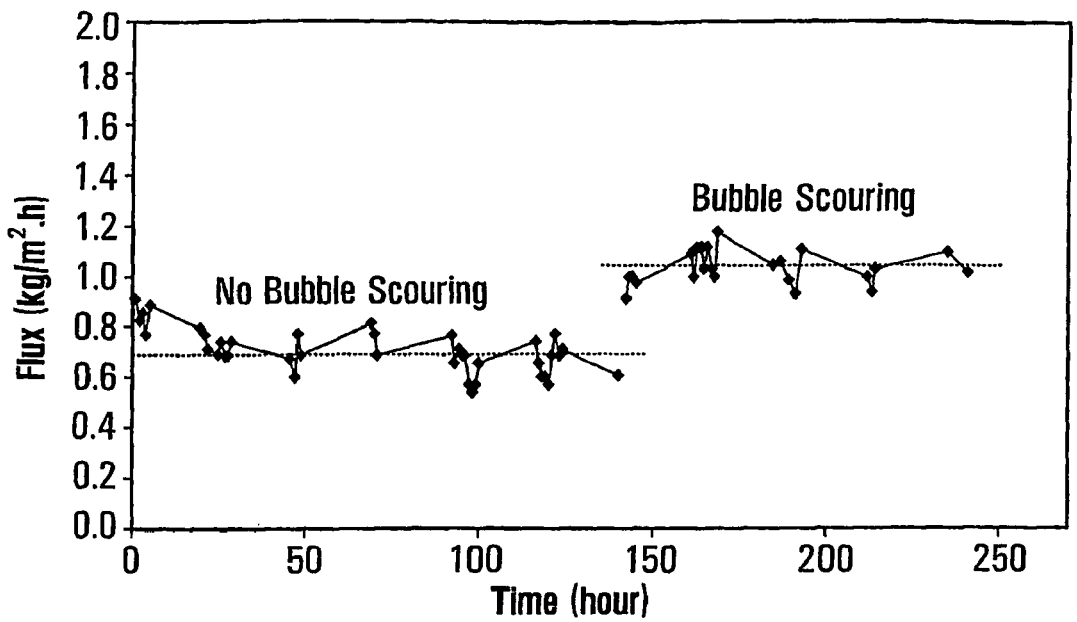
FIGS. 13 to 16 are respectively data graphs of measured permeate flux during testing of respective exemplary MDBR systems.

The observed permeate flux is shown in FIG. 13. As can be seen, the permeate flux did not decrease significantly over the 11-day period. In fact, when the membrane surface was scoured with bubbles, the permeate flux increased by about 30%. The average permeate flux was 0.71±0.09 kg/m²h during bubble scouring.

Example II

In this example, permeate flux was monitored for different types of membrane modules. The bioreactor used had a chamber volume of 48 liters. A thermostat circulator was used to control the temperatures and to provide internal circulations in the mixed liquor. In different tests, both flat-sheet and tubular membrane modules were used. The particulars of the membranes and membrane modules tested are listed in Tables I and II respectively.

The inflow wastewater used was artificially composed. The chemical composition of the inflow wastewater used is listed in Table III. The different characteristics of the inflow wastewater for different tests are listed in Table IV. The measured results are shown in Tables V and VI, and FIGS. 14 to 16.

TABLE I

Membrane used in the tests

| Membrane | I | II | III |
|---|---|---|---|
| Type | Flat sheet | Flat sheet | Tubular |
| Material | PVDF | PTFE | PVDF |
| Source | Millipore ™ | Sartorius ™ | Asahi ™, Pall ™ |
| Pore size (nm) | 0.22 | 0.45 | 0.2 |
| Wall thickness (mm) | 0.125 | 0.070 | 0.650 |
| Porosity | 80% | 70% | 70% |

TABLE II

Membrane modules used in the tests

| Module | I | II | III |
|---|---|---|---|
| Type | Flat sheet | Tubular | Tubular |
| Total membrane size | 0.0134 m² | 0.0347 m² | 0.0347 m² |
| Effective length | 0.14 m | 0.115 m | 0.115 m |
| Size of the permeate channel | 4.5 cm | 2.6 mm (ID) | 2.6 mm (ID) |
| Number of membranes | | 24 | 24 |
| Other feature | double-faced with baffle | Tubes in diamond-square pattern | Tubes in octagonal pattern |

TABLE III

Wastewater composition

| Chemicals | Concentration |
|---|---|
| Glucose | 12.5 g/L |
| Peptone | 6.25 g/L |
| NaHCO₃ | 0.218 g/L |
| MgSO₄ | 0.156 g/L |
| KH₂PO₄ | 0.812 g/L |
| K₂HPO₄ | 1.219 g/L |
| CaCl₂ | 0.156 g/L |

TABLE IV

Wastewater characteristics

| Tests | Test I | Test II | Test III |
|---|---|---|---|
| COD | 22,341 mg $O_2$/L (total 0.073 kg/day) | 22,341 mg $O_2$/L (total 0.073 kg/day) | 45,408 mg $O_2$/L (total 0.218 kg/day) |
| TOC | 3,895 ppm (total 0.013 kg/day) | 3,895 ppm (total 0.013 kg/day) | 7,946 ppm (total 0.038 kg/day) |
| Total COD loading per bioreactor volume | 1.46 kg·m$^{-3}$·day$^{-1}$ | 1.46 kg·m$^{-3}$·day$^{-1}$ | 4.54 kg·m$^{-3}$·day$^{-1}$ |
| Total TOC loading per bioreactor volume | 0.26 kg·m$^{-3}$·day$^{-1}$ | 0.26 kg·m$^{-3}$·day$^{-1}$ | 0.79 kg·m$^{-3}$·day$^{-1}$ |
| pH | 6.82 | 6.82 | 6.44 |
| Conductivity | 2.26 s/m | 2.26 s/m | 3.04 s/m |
| MLSS | 1.4-1.6 g/L | 1.4-1.6 g/L | 5.3-5.6 g/L |

TABLE V

Fouling on membrane surface

| Materials in fouling layer | | Membrane I | Membrane II |
|---|---|---|---|
| Protein (mg/L) | Soluble | 168.10 | 332.53 |
| | Non-soluble | 181.38 | 383.98 |
| | Total | 349.48 | 716.51 |
| Polysaccharides (mg/L) | Soluble | 552.75 | 553.68 |
| | Non-soluble | 491.99 | 405.53 |
| | Total | 1044.74 | 959.21 |
| Extracellular polymeric substance (EPS) (mg/L) | Soluble | 720.85 | 886.21 |
| | Non-soluble | 673.37 | 789.51 |
| | Total | 1394.22 | 1675.72 |

Test I:

In Test I, the setup of the MDBR system was similar to that shown in FIG. 6. The membrane module used was membrane module II. It was submerged in the mixed liquor and horizontally oriented. The average gaps between the tubular membranes were about 3 mm.

The permeate side temperature was digitally controlled using a refrigerator and a cooling coil. The permeate temperature was monitored at the inlet and outlet of the membrane module using digital thermometers.

A digital peristaltic pump was used to control the permeate flow rate at 1000 ml/min with a corresponding Reynolds number of 347. The MLSS concentration was in the range of 1.4-1.6 g/L. The solid retention time was infinite (there was no sludge wastage). The mixed liquor was aerated and the total aeration rate was 12.5 L/min or 0.26 L/min per MLSS unit volume. 10 L/min of air was fed to the mixed liquor from air diffusers for biological activities. Another 2.5 L/min air stream was injected under the immersion heater directly to prevent damage due to the formation of microbial floc cakes resulting from accumulations of microbial floc on the heating coils.

Figure 14:
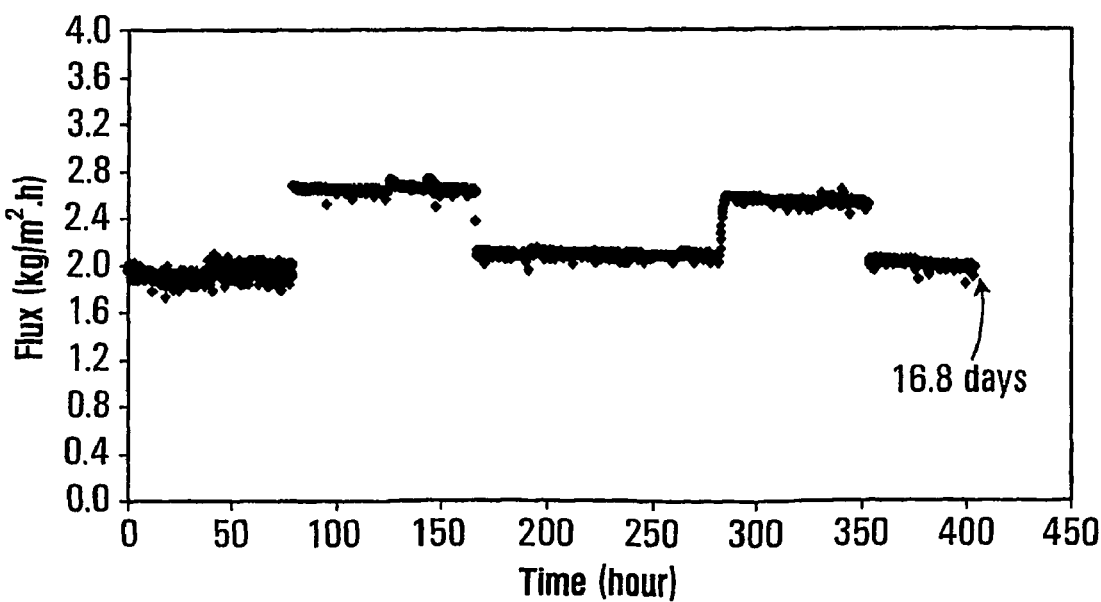

The mixed liquor temperature was at about 46° C. The permeate temperature was alternatively set at 25° C. or 15° C., with a continued duration of approximately 3 days at each temperature. The measured permeate flux was dependent on the permeate temperature, as shown in FIG. 14. The permeate flux was essentially constant at each temperature, but changed significantly when the temperature was lowered or raised, due to the change in partial vapor pressure difference. The average permeate flux was approximately 20% higher at 15° C. (about 2.6 L/m$^2$h) than at 25° C. (about 2 L/m$^2$h). The permeate flux was rather stable over the 16.8 days of operation. It appeared that fouling did not occur in the system at this level of permeate flux and bioreactor temperature. The TOC in the permeate was found to be lower than 0.7 ppm, and the COD of the permeate was lower than 0.5 ppm.

After about 16.8 days, the membrane module was removed from the bioreactor. The membrane module was inspected for any deposition of fouling/cake layers. It was observed that there was no cake/fouling layer deposited on the tubular membrane surface, but some small MLSS flocs were deposited at the sides of the membrane tube potting bases. This suggested i) the area adjacent to the potting bases had the poorest hydrodynamics, and poor heat and mass transfer efficiency, in the submerged MDBR module, and ii) more deposition of MLSS flocs at these positions could be expected at higher MLSS concentrations.

Test II:

In Test II, the setup of the MDBR system was similar to that shown in FIG. 5. The membrane module used was of type I with different membrane materials. The mixed liquor was at a temperature of about 56° C. The permeate temperatures at the inlet and outlet of the membrane module were monitored with digital thermometers and the average permeate temperature was kept constant at 25° C. A digital peristaltic pump was used to control the permeate flow rate at 700 ml/min with corresponding Reynolds number of 248. The MLSS concentration was in the range of 1.4-1.6 g/L. The SRT was infinite. The air aeration was performed similarly as in Test I.

The TOC in the permeate was found to be lower than 0.4 ppm, and the COD of the permeate was almost zero.

Figure 15:
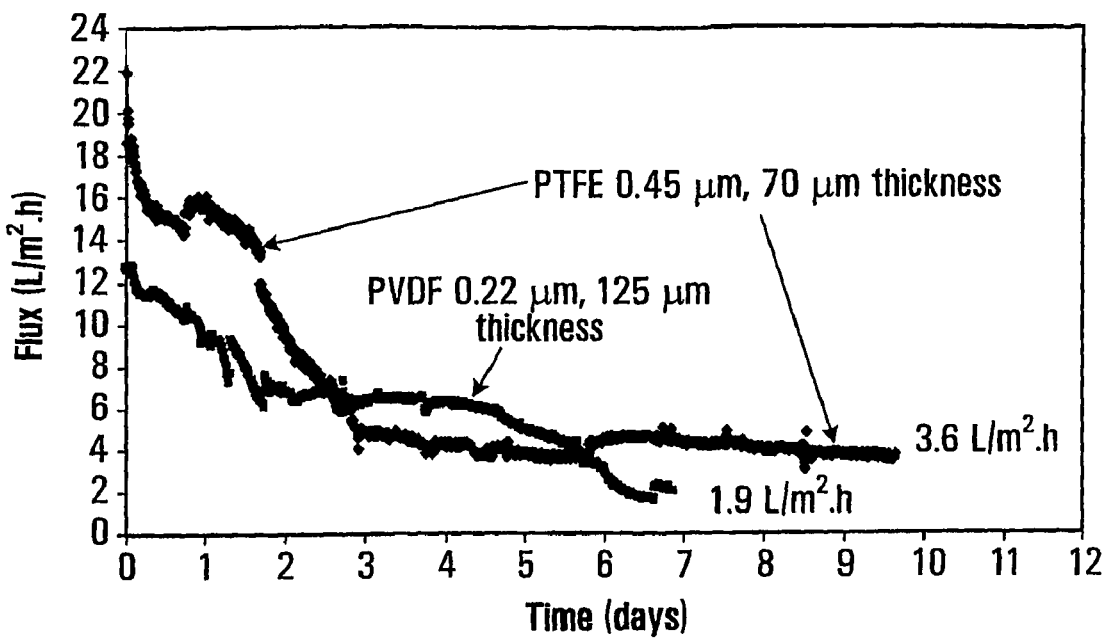

The permeate fluxes for different membrane materials (PVDF or PTFE) were measured and shown in FIG. 15. The PTFE membrane used had a thickness of about 70 micron and pore sizes of about 0.45 micron. The PVDF membrane used had a thickness of about 125 micron and pore sizes of about 0.22 micron. As shown, the fluxes declined for both PVDF and PTFE types of membrane materials. The permeate fluxes for the PVDF flat sheet membrane decreased from 12.7 L/m$^2$h to 1.9 L/m$^2$h in 7 days. Further flux reduction may be possible. The permeate fluxes for the PTFE flat sheet membrane decreased from 20.1 L/m$^2$h to 3.6 L/m$^2$h in 10 days. The flux appeared to have stabilized at the latter value. The flux decay appeared worse for PVDF than for PTFE. Cake/fouling layers were found on the membrane surfaces for both PVDF and PTFE flat sheet membranes. The composition of the cake/fouling layers was analyzed in terms of protein, polysaccharide, and extracellular polymeric substance (EPS) concentrations. The results are shown in Table V. Although PTFE flat sheet membranes provided a higher and more stable permeate flux, the total protein and EPS deposition on the PTFE flat sheet membranes was much higher than that found on PVDF flat sheet membranes. The concentration of polysaccharides deposit was lower on the PTFE flat sheet membranes than on the PVDF membranes. This result suggests that polysaccharides probably played an important role in fouling of the membrane surfaces in the MDBR process. It may be expected that fouling is more likely under the test conditions of Test II (at 56° C. of mixed liquor temperature) than under the test conditions of test I (at 46° C. of mixed liquor temperature), due to the changes in permeate flux. More aeration or improved hydrodynamic conditions, or a combination of both, may be effective for controlling permeate flux when a tubular membrane module is used.

Test III:

Test III was conducted using a setup similar to that shown in FIG. 6. The membrane module used was membrane module III, and was submerged in the mixed liquor. The mixed liquor temperature was about 56° C. The test conditions were as listed in Table IV. The SRT was 137 days. The permeate temperature at the permeate side was controlled to be at about 25° C.

Figure 9:
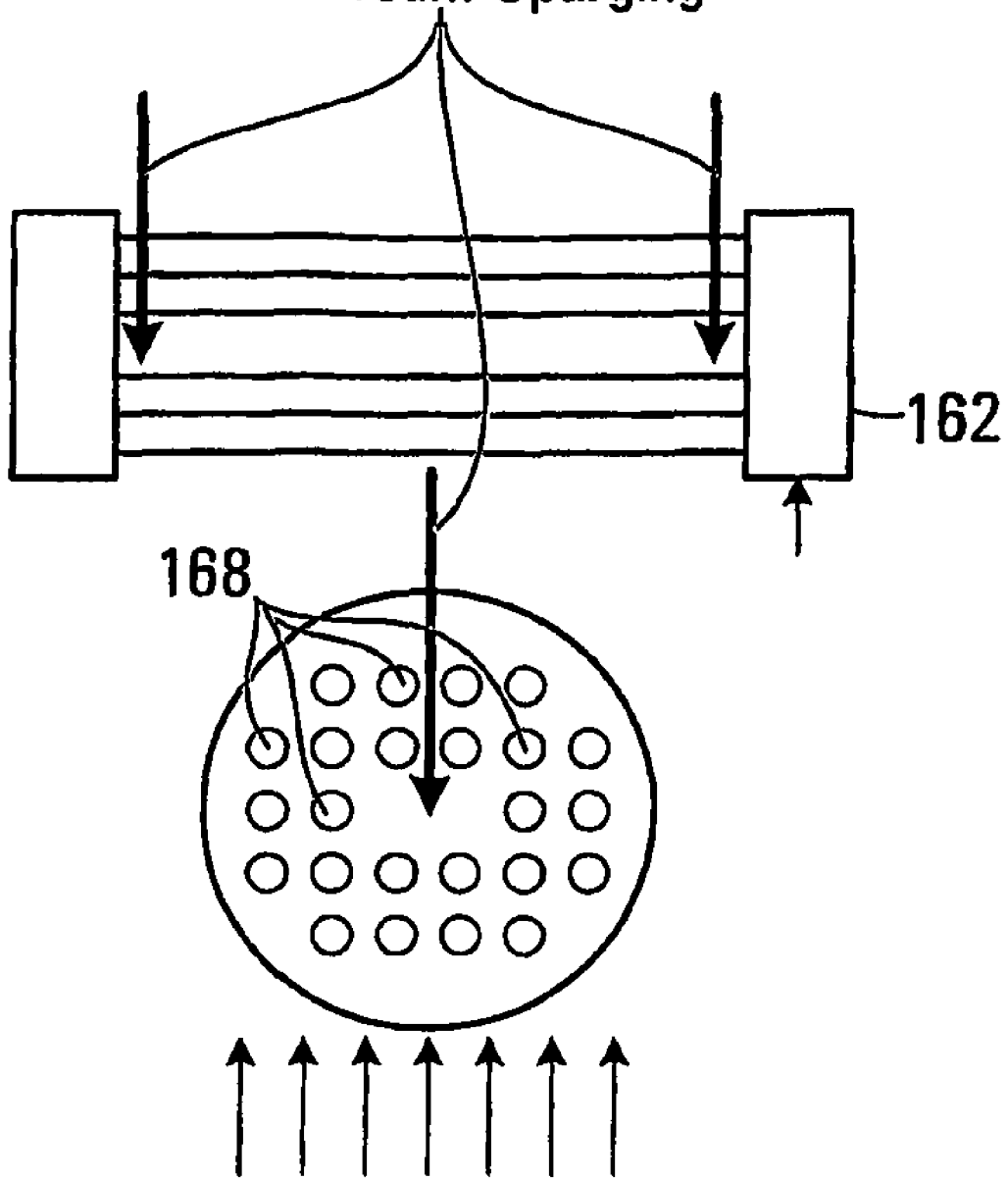
FIG. 9 includes schematic side and cross-sectional views of the tubular membrane module of FIG. 8.

The membrane module was air sparged as illustrated in FIG. 9. The two air streams, as indicated by the arrows in FIG. 9, were injected near the potting bases at the center of the membrane tube bundle. Each air stream had an air flow rate of 2.5 L/min. These two air sparging streams were used to promote a turbulent flow regime in the membrane tube bundle and to enhance the permeate fluxes. The permeate temperatures at inlet and outlet of the membrane module were monitored using digital thermometers. A digital peristaltic pump was used to control the permeate flow rate, which was at about 1000 ml/min with a corresponding Reynolds number of 347. Total aeration rate was 17.5 L/min or 0.36 L/min per MLSS volume. 10 L/min aeration was fed by four air diffusers, for promoting biological activities and mixing in mixed liquor. Two air streams (2.5 L/min each) were injected inside the membrane bundle, as discussed above. Another air stream with a flow rate of 2.5 L/min was injected under the heating coil of the immersion heater to prevent damage to the microbial cake formed from accumulation of flocs on the heating coil.

Figure 16:
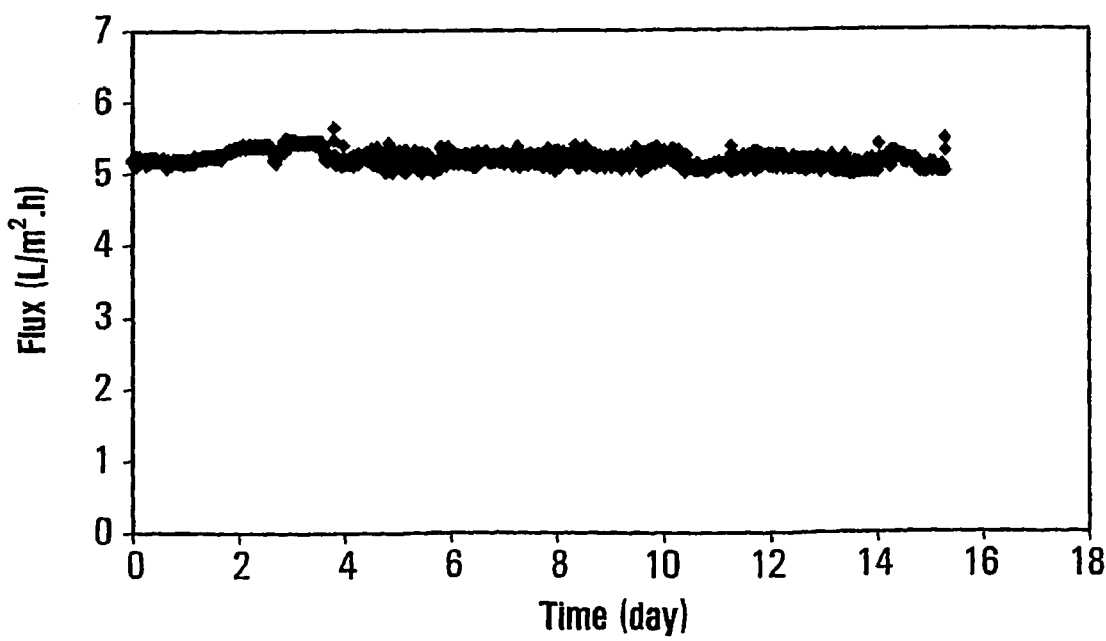

The permeate flux was monitored and the results are shown in FIG. 16. The permeate flux was almost constant over a 15-day testing period. The permeate flux varied within a small range of 5.01-5.46 L/m$^2$h, with an average value of 5.17 L/m$^2$h.

The improved permeate flux stability may be due to improved hydrodynamic conditions and the octagonal layout of the membrane channels.

The permeate was of high quality with a TOC value lower than 0.2 ppm and the COD value being almost zero.

Test results showed that sludge production in a heated bioreactor was relatively low but TOC in the bioreactor was constant. It appeared that the endogenous respiration for thermophilic bacteria was relatively low.

The results showed that a submerged MDBR process may provide acceptable permeate flow rates with high permeate quality. The permeate flux obtained from a submerged MDBR at approximately 5.16 L/m$^2$h was 123 times higher than in a reported submerged nanofiltration (NF)-MBR and the permeate TOC was lower than 0.3 ppm.

Other features, benefits and advantages of the embodiments described herein not expressly mentioned above can be understood from this description and the drawings by those skilled in the art.

The contents of each reference cited above are hereby incorporated herein by reference.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A method of treating a contaminated inflow, comprising:
providing a bioreactor vessel defining a reaction chamber;
providing a distillation membrane located within said reaction chamber and in fluid communication with an outlet conduit;
placing a biological agent and said contaminated inflow in said reaction chamber to biodegrade a contaminant in said contaminated inflow with said biological agent, thus producing a biodegraded inflow with reduced contamination;
distilling, by membrane distillation, said biodegraded inflow through said distillation membrane to produce an outflow; and
extracting said outflow out of said reaction chamber through said outlet conduit.

2. The method of claim 1 wherein said contaminated inflow comprises wastewater and said outflow comprises water.

3. The method of claim 1 wherein said biological agent comprises a biomass.

4. The method of claim 1 wherein said membrane distillation (MD) comprises at least one of direct contact MD, air-gap MD, sweeping-gas MD, vacuum MD, and isothermal (osmotic) MD.

5. The method of claim 1 comprising heating said lower contaminant inflow.

6. The method of claim 1 comprising aerating said reaction chamber with a gas.

7. The method of claim 1 wherein said distillation membrane has a feed side in contact with said biodegraded inflow and a permeate side from which said outflow is collected.

8. The method of claim 7 wherein said distillation membrane is submerged in said biodegraded inflow.

9. The method of claim 7 wherein said feed side is at a first temperature, said permeate side is at a second temperature, and said first temperature is higher than said second temperature by 5 to 70° C.

10. The method of claim 9 wherein said first temperature is in the range of 10 to 90° C., and said second temperature is in the range of 5 to 30° C.

11. The method of claim 1 wherein said distillation membrane is porous, having an average pore size in the range of 0.05 to 5 micron.

12. The method of claim 1 wherein said distillation membrane has a thickness in the range of 0.05 mm to 1.5 mm.

13. The method of claim 1 wherein said distillation membrane has hydrophobic properties.

14. A system for treating a contaminated inflow, comprising:
a bioreactor vessel defining a reaction chamber, for biodegrading said contaminated inflow in said reaction chamber with a biological agent to produce a biodegraded inflow with reduced contamination;
a distillation membrane located within said reaction chamber, for distilling, by membrane distillation through said distillation membrane, said biodegraded inflow to produce an outflow; and an outlet conduit in fluid communication with said distillation membrane for extracting said outflow out of said reaction chamber.

15. The system of claim 14 wherein said distillation membrane has a hydrophobic surface.

16. The system of claim 14 wherein said distillation membrane comprises at least one of a flat-sheet membrane, a tubular membrane, and a hollow fiber membrane.

17. The system of claim 14 wherein said distillation membrane comprises a material selected from polypropylene, polyvinylidene fluoride, and polytetrafluoroethylene.

18. The system of claim 14 wherein said membrane distillation (MD) comprises at least one of direct contact MD, air-gap MD, sweeping-gas MD, vacuum MD, and isothermal (Osmotic) MD.

19. The system of claim 14 comprising a gas injector coupled to said bioreactor vessel for aerating said reaction chamber with a gas.

20. The system of claim 19 wherein said gas comprises air.

21. The system of claim 14 comprising a heater for heating said biodegraded inflow.

22. The system of claim 14 comprising a fluid circuit for flowing a carrying fluid to carry said outflow away from said distillation membrane.

23. The system of claim 22 comprising a cooling device for cooling said carrying fluid.

24. The system of claim 22 wherein said fluid circuit comprises a fluid loop for recycling said carrying fluid.

25. The system of claim 14 wherein said distillation membrane is porous and has an average pore size in the range of 0.05 to 5 micron.

26. The system of claim 14 wherein said distillation membrane has a thickness in the range of 0.05 mm to 1.5 mm.

27. The system of claim 14 comprising a membrane module selected from a doublefaced flat-sheet membrane module, a flat sheet cassette membrane module, a tubular membrane module, hollow fiber module and a spiral wound membrane module, said membrane module comprising said distillation membrane.

28. The system of claim 27 wherein said membrane module defines an internal fluid channel for receiving said outflow permeated through said distillation membrane, said membrane module positioned to be submerged in said biodegraded inflow.

29. The system of claim 14 comprising a baffle supporting said distillation membrane.

30. A method of treating wastewater comprising:
providing a bioreactor vessel defining a reaction chamber;
providing a distillation membrane in said reaction chamber;
biodegrading a contaminant in said wastewater with a biomass in said reaction chamber to produce low contaminant wastewater; and
distilling, by membrane distillation, said low contaminant wastewater through said distillation membrane to produce purified water.

31. The method of claim 30 wherein said biomass is activated.

32. The method of claim 31 wherein said activated biomass comprises activated sludge.

33. The method of claim 30 wherein said biodegrading comprises biodegrading said contaminant aerobically or anaerobically.

34. A method of treating wastewater comprising:
providing a bioreactor vessel defining a reaction chamber;
providing a distillation membrane in said reaction chamber;
biodegrading a contaminant in said wastewater with a biomass in said reaction chamber to produce low contaminant wastewater, said biomass comprising thermophilic bacteria;
heating said low contaminated wastewater; and
distilling, by membrane distillation, said low contaminant wastewater through said
distillation membrane to produce purified water.

35. The method of claim 34 wherein said distillation membrane is located outside said bioreactor.

36. The method of claim 35 wherein at least a portion of said biomass is circulated from said bioreactor vessel to said distillation membrane and then back to said bioreactor vessel.

37. A system for treating wastewater comprising:
a bioreactor vessel defining a reaction chamber, for biodegrading a contaminant in said wastewater with a biomass in said reaction chamber to produce low contaminant wastewater; and
a distillation membrane in said bioreactor vessel, for distilling, by membrane distillation through said distillation membrane, said low contaminant wastewater to produce purified water.

38. The system of claim 37 wherein said biomass is activated.

39. The system of claim 38 wherein said activated biomass comprises activated sludge.

40. The system of claim 37 wherein said biomass is capable of biodegrading said contaminant aerobically.

41. The system of claim 37 wherein said biomass is capable of biodegrading said contaminant anaerobically.

42. The system of claim 37 comprising a heater for heating said bioreactor.

43. The system of claim 37 wherein said biomass comprises thermophilic bacteria.

44. The system of claim 37 wherein said distillation membrane is located outside said reaction chamber.

45. The system of claim 44 wherein at least a portion of said biomass is circulated form said reaction chamber to said distillation membrane and then back to said reaction chamber.

* * * * *

UNITED STATES PATENT AND TRADEMARK OFFICE
CERTIFICATE OF CORRECTION

PATENT NO. : 8,318,017 B2
APPLICATION NO. : 11/993665
DATED : November 27, 2012
INVENTOR(S) : Fane et al.

Page 1 of 1

It is certified that error appears in the above-identified patent and that said Letters Patent is hereby corrected as shown below:

In the Claims:

Col. 20, Claim 45, Line 51, "is circulated form" should read --is circulated from--.

Signed and Sealed this
Fourth Day of June, 2013

Teresa Stanek Rea
*Acting Director of the United States Patent and Trademark Office*